W. Gale,

Straw Cutter.

No. 1977. Reissued May 30. 1865.

Inventor Warren Gale

Witnesses Geo. W. Roberts

Alfred W. Taylor

N. PETERS, PHOTO-LITHOGRAPHER, WASHINGTON, D. C.

UNITED STATES PATENT OFFICE.

WARREN GALE, OF CHICOPEE FALLS, MASSACHUSETTS, ASSIGNOR TO HIMSELF AND B. B. BELCHER, OF SAME PLACE.

IMPROVEMENT IN STRAW-CUTTERS.

Specification forming part of Letters Patent No. 31,001, dated December 18, 1860; Reissue No. 1,977, dated May 30, 1865.

*To all whom it may concern:*

Be it known that I, WARREN GALE, of Chicopee Falls, in the county of Hampden and State of Massachusetts, have invented a new and improved mode of attaching and arranging the moving knife in connection with the stationary blade or mouth-piece of hand-lever hay, straw, and stalk cutters; and I do hereby declare that the following is a full and exact description thereof, reference being had to the accompanying drawings, making part of this specification—

Figure 1:
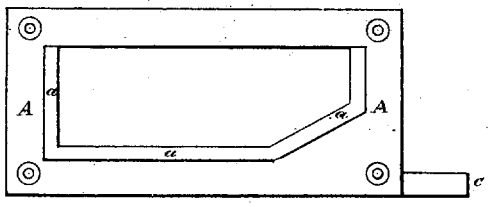
Figure 2:
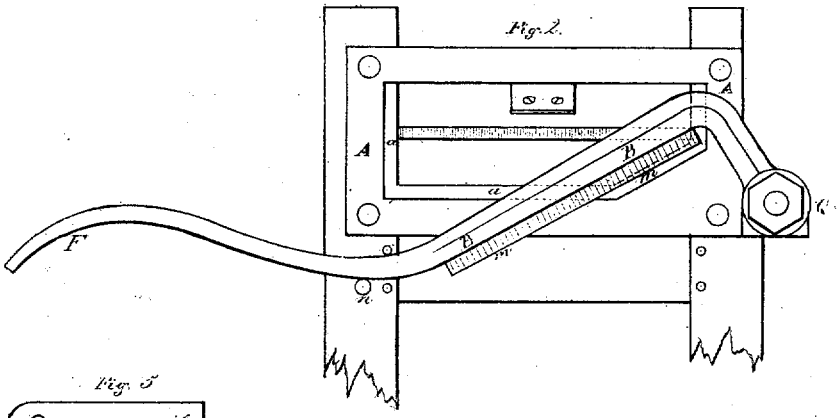
Figure 5:
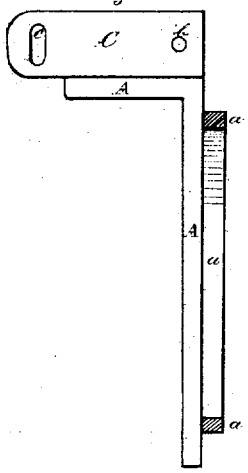
Figure 3:
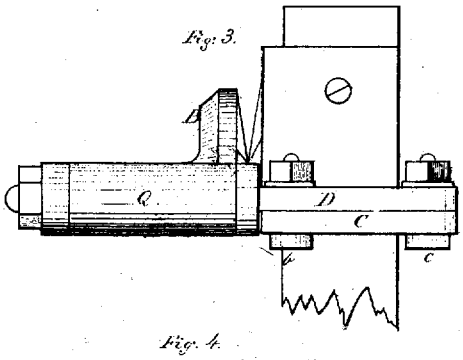
Figure 4:
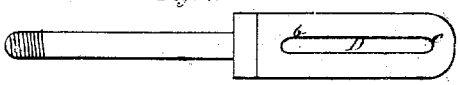

Figure 1 being a front view of the stationary blade or mouth-piece; Fig. 2, a front view representing the mouth-piece and moving knife in position on the cutting-box frame or support; Fig. 3, an off side view of parts as in Fig. 2; Fig. 4, a plan of the mouth-piece or stationary blade; Fig. 5 a plan of the knife-pivot detached.

Like letters designate corresponding parts in all of the figures.

In instruments of this class for cutting fodder, as heretofore constructed, the pivot of the knife-lever has been secured to the wood-work of the apparatus, and separately from the attachment of the stationary blade or mouth-piece to the same; and since wood is always liable to swell and shrink with variations in the moisture of the atmosphere, frequent disarrangements of the relative positions of these cutting parts have been unavoidable with such constructions, thus rendering the cutter imperfect and difficult of operation, or even useless at times, as well as causing rapid destruction of parts by the interference of the moving-knife with the cutting-edges of the stationary blade. The difficulties have also been greatly increased by the want of proper and complete means of adjusting the moving knife in relation to the stationary blade, so as to correct any possible disarrangement, and to permit the cutting-edges of the blades to be sharpened when required.

The object of my improvements is to obviate these defects; and to this end the first feature of my invention consists in effecting an immediate or direct metallic connection between the pivot of the moving knife and the mouth-piece, irrespective and independent of their attachment to the wood-work or common support of the implement, and so that they may be removed in a body from the wood-work or support without disconnecting them from each other, or disarranging their correct relation to each other, while the second general feature of my invention consists in producing the capabilities of complete adjustments to fulfill the purposes designated.

The parts to which my improvements relate may be mounted upon any form or kind of cutting-box frame or support. It will be sufficient to indicate their connection, either permanently or removably, with an ordinary cutting-box having bottom and side boards supported on legs or frame-work, the bottom being inclined and the sides converging toward the cutting end, so as to compress the fodder for the cutting, and the usual spring top board for compressing the fodder downward, together with any known means of forcing or feeding the fodder to the knife, unless that is accomplished by hand. To the proper end of such a cutting-box the cast-iron mouth-piece or stationary blade A is secured in the usual manner, the projecting inner edges, *a a a*, thereof being ground or otherwise dressed to the same outer plane, and forming the stationary cutting-edges of the instrument.

Upon one end of the mouth-piece A, I form a metallic projection, C, being either cast with, in one piece, or as a separate piece immovably secured to the mouth-piece. This projection serves as a step or carrier for the pivot of the moving knife, and provides the desired metallic connection between the said pivot and mouth-piece without the use of wood intermediate between the two, and this in the most desirable way, although I do not confine the metallic connection between the said parts to the employment of such a carrier. A convenient form of this carrier is indicated in the drawings, and it thereby furnishes a ready and proper means of applying my improved adjustments, substantially as follows: The knife-pivot D is provided with a flange which extends over and rests upon the carrier C, to which it is secured by two screw-bolts, or their equivalents, as seen at *b c*, Fig. 3. These bolts extend through a longitudinal slot or slots of the pivot-flange, as shown in Fig. 4, and respectively through a round bolt-hole, *b*, and transverse oblong aperture or slot *c* in the carrier, as seen in Fig. 5, the hole *b* being next to the face of the mouth-piece. The longitudinal slot of the pivot-flange allows the pivot carrying the moving knife to be adjusted bodily, either directly toward or from the mouth-piece, as required, while the transverse slot *c* in the carrier allows the pivot-flange to turn in the arc of a circle around the bolt in the hole *b*, as a center, thereby causing the moving knife to be angularly adjusted in respect to the mouth-piece, so as to touch equally the entire edges *a a a* along the whole length of the knife-edge. When the adjustments have been thus accurately accomplished, the screw-bolts are tightened, clamping the carrier C and the pivot flange securely together. The longitudinal slot may be in the carrier C, and the bolt-hole and transverse slot may be in the pivot-flange, if desired, the effect being the same as in the manner described. By substantially this or equivalent means I get the two important—the angular and distance—adjustments required for the successful operation of the instrument, and thus all the defects enumerated incident to the use of the lever-knife, as previously existing, are completely obviated without adding to the cost or increasing the complexity of the instrument, and one thereby produced which can be always kept in repair without expense, and with only the expenditure of a little time required in adjusting and sharpening the cutting-edges. The knife-lever F, which is generally made of cast-iron, has a long fulcrum-socket, Q, to receive the pivot D, so as to give stability and firmness of action to the knife *m*, which is secured to the part B of the lever by short countersunk bolts, screws, or rivets. The lever is so formed and arranged in relation to the cutting-edges *a a* as to give a draw cut, substantially as shown, and its downward motion is limited by a stop, *n*, Fig. 2.

The advantages of my improvements are important, since they secure great ease of operation and perfection of action, as well as durability, by allowing the cutting-edges to be repeatedly ground and adjusted to each other as often as required till entirely worn out. The metallic connection between the cutting parts and their removability in a body from the cutting box or frame without disarranging their adjustments and relation of parts also are of peculiar value, enabling the metallic parts to be transported separately from the wooden part, thus cheapening and facilitating the transportion, as well as allowing them to be put together and adjusted properly, and then be applied by any one to any cutting-box or support, so as frequently to save the cost of the box or frame, and so that any one, however unskilled, may put the implement in working order.

What I claim as my invention, and desire to secure by Letters Patent, is—

1. The arrangement of the knife-pivot upon a step or carrier, so as to produce angular and distance adjustments of the knife to the cutting-edges of the stationary blade or mouth-piece, whether the carrier is in one piece with or attached immediately to the mouth-piece or is separate therefrom.

2. The combination and arrangement of the carrier C and flange of the pivot D, provided respectively with the longitudinal slot and with the bolt-hole *b* and transverse slot *c*, for producing the adjustment desired, substantially as herein specified.

WARREN GALE.

Witnesses:
H. W. BULLOCK,
GEORGE S. TAYLOR.